United States Patent
Oh et al.

(10) Patent No.: US 9,509,976 B2
(45) Date of Patent: Nov. 29, 2016

(54) IMAGE DISPLAY SYSTEM AND DISPLAY METHOD THEREOF

(71) Applicant: SAMSUNG Electronics Co., Ltd., Suwon-si, Gyeonggi-do (KR)

(72) Inventors: Sung Bo Oh, Suwon-si (KR); Tae Hee Lee, Yongin-si (KR); Hong Gyu Han, Suwon-si (KR); Young Taek Yoo, Hwaseong-si (KR); Song Ki Cho, Suwon-si (KR); Ho Shin Lee, Yongin-si (KR); Se Min Jin, Suwon-si (KR); Yu Whan Kwak, Busan (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 139 days.

(21) Appl. No.: 14/479,417

(22) Filed: Sep. 8, 2014

(65) Prior Publication Data

US 2014/0376880 A1    Dec. 25, 2014

Related U.S. Application Data

(63) Continuation of application No. 13/020,932, filed on Feb. 4, 2011, now Pat. No. 9,014,539.

(30) Foreign Application Priority Data

Feb. 18, 2010    (KR) .................. 10-2010-0014718

(51) Int. Cl.
*H04N 5/765*    (2006.01)
*H04N 9/80*    (2006.01)
(Continued)

(52) U.S. Cl.
CPC .......... *H04N 13/0066* (2013.01); *G09G 5/006* (2013.01); *G11B 27/34* (2013.01);
(Continued)

(58) Field of Classification Search
CPC .................. H04N 13/0055; H04N 13/0029; H04N 13/0059; H04N 13/0454; G11B 31/006; G11B 27/34

USPC ....... 386/231, 232, 210, 212, 213, 223, 224, 386/248, 324
See application file for complete search history.

(56) References Cited

U.S. PATENT DOCUMENTS

| | | |
|---|---|---|
| 7,663,805 B2 | 2/2010 | Zaloum et al. |
| 2003/0170009 A1 | 9/2003 | Itoh et al. |

(Continued)

FOREIGN PATENT DOCUMENTS

| | | |
|---|---|---|
| EP | 1111572 | 6/2001 |
| EP | 1659565 | 5/2006 |

(Continued)

OTHER PUBLICATIONS

Notice of Allowance mailed Nov. 9, 2012 in parent U.S. Appl. No. 13/020,932 (9 pages).

(Continued)

*Primary Examiner* — Robert Chevalier
(74) *Attorney, Agent, or Firm* — Staas & Halsey LLP

(57) ABSTRACT

An image display system and a display method thereof are provided. The image display system includes an optical disc having image information thereon, an image display device having extended display identification data (EDID), and a reproduction device to analyze the EDID to determine an interface to connect with the image display device, if the image information is three-dimensional (3D) image information, and instruct the image display device to output an alarm text, if the interface is an analog. When the interface is an analog interface, the reproduction device may output an analog two-dimensional (2D) image or 3D image through the image display device. Even when the image display device and the reproduction device are interconnected via an analog interfaces, a 2D or 3D image may be output based on the 3D image information.

21 Claims, 8 Drawing Sheets

(51) Int. Cl.
| | | |
|---|---|---|
| *H04N 13/00* | (2006.01) | |
| *H04N 9/82* | (2006.01) | |
| *G09G 5/00* | (2006.01) | |
| *G11B 27/34* | (2006.01) | |
| *G11B 31/00* | (2006.01) | |
| *H04N 13/04* | (2006.01) | |
| *G09G 3/00* | (2006.01) | |
| *G09G 5/36* | (2006.01) | |

(52) U.S. Cl.
CPC ......... *G11B 31/006* (2013.01); *H04N 9/8227* (2013.01); *H04N 13/0029* (2013.01); *H04N 13/0055* (2013.01); *H04N 13/0059* (2013.01); *H04N 13/0454* (2013.01); *G09G 3/003* (2013.01); *G09G 5/36* (2013.01); *G09G 2340/0407* (2013.01); *G09G 2360/02* (2013.01); *G09G 2370/04* (2013.01); *G09G 2370/042* (2013.01); *G09G 2370/12* (2013.01); *G09G 2370/22* (2013.01); *H04N 13/004* (2013.01); *H04N 13/0456* (2013.01)

(56) References Cited

U.S. PATENT DOCUMENTS

| | | |
|---|---|---|
| 2007/0024462 A1 | 2/2007 | Kitaura |
| 2007/0057931 A1 | 3/2007 | Takamori |
| 2008/0008172 A1 | 1/2008 | Kobayashi |
| 2008/0303746 A1 | 12/2008 | Schlottmann et al. |
| 2009/0079686 A1 | 3/2009 | Herz et al. |
| 2009/0128622 A1 | 5/2009 | Uchiumi et al. |
| 2010/0182402 A1 | 7/2010 | Nakajima et al. |
| 2012/0188338 A1 | 7/2012 | Fukuyama |
| 2012/0249736 A1* | 10/2012 | Barrett ............... H04N 13/0029 348/43 |

FOREIGN PATENT DOCUMENTS

| | | |
|---|---|---|
| EP | 1998307 | 12/2008 |
| WO | 2010/008012 | 1/2010 |

OTHER PUBLICATIONS

Notice of Allowance mailed Mar. 1, 2013 in parent U.S. Appl. No. 13/020,932 (6 pages).
Notice of Allowance mailed Jun. 20, 2013 in parent U.S. Appl. No. 13/020,932 (6 pages).
Non-Final Office Action dated Oct. 15, 2013 in parent U.S. Appl. No. 13/020,932 (6 pages).
Final Office Action dated Feb. 5, 2014 in parent U.S. Appl. No. 13/020,932 (5 pages).
Notice of Allowance mailed May 16, 2014 in parent U.S. Appl. No. 13/020,932 (5 pages).
Notice of Allowance mailed Aug. 27, 2014 in parent U.S. Appl. No. 13/020,932 (6 pages).
Extended European Search Report dated May 28, 2014 issued in EP Application No. 11150310.8.
A Release: "VESA Enhanced EDID Standard E-EDID (TM) Standard VESA Enhanced Extended Display Identification Data Standard", Sep. 25, 2006, XP055118056, Retrieved from the Internet: URL:ftp://ftp.cis.nctu.edu.tw/pub/csie/Software/X11/private/VeSaSpEcS/VESA_Document_Center_Monitor_Interface/EEDIDrAr2.pdf [retrieved on May 14, 2014] *p. 24*.
U.S. Notice of Allowance dated Dec. 19, 2014 in U.S. Appl. No. 13/020,932, 6 pages.
European Office Action dated Sep. 20, 2016 in related European Patent Application No. 11150310.8 (4 pages).
U.S. Appl. No. 13/020,932, filed Feb. 4, 2011, Sung Bo Oh et al., Samsung Electronics Co., Ltd. Suwon-si, KR.

* cited by examiner

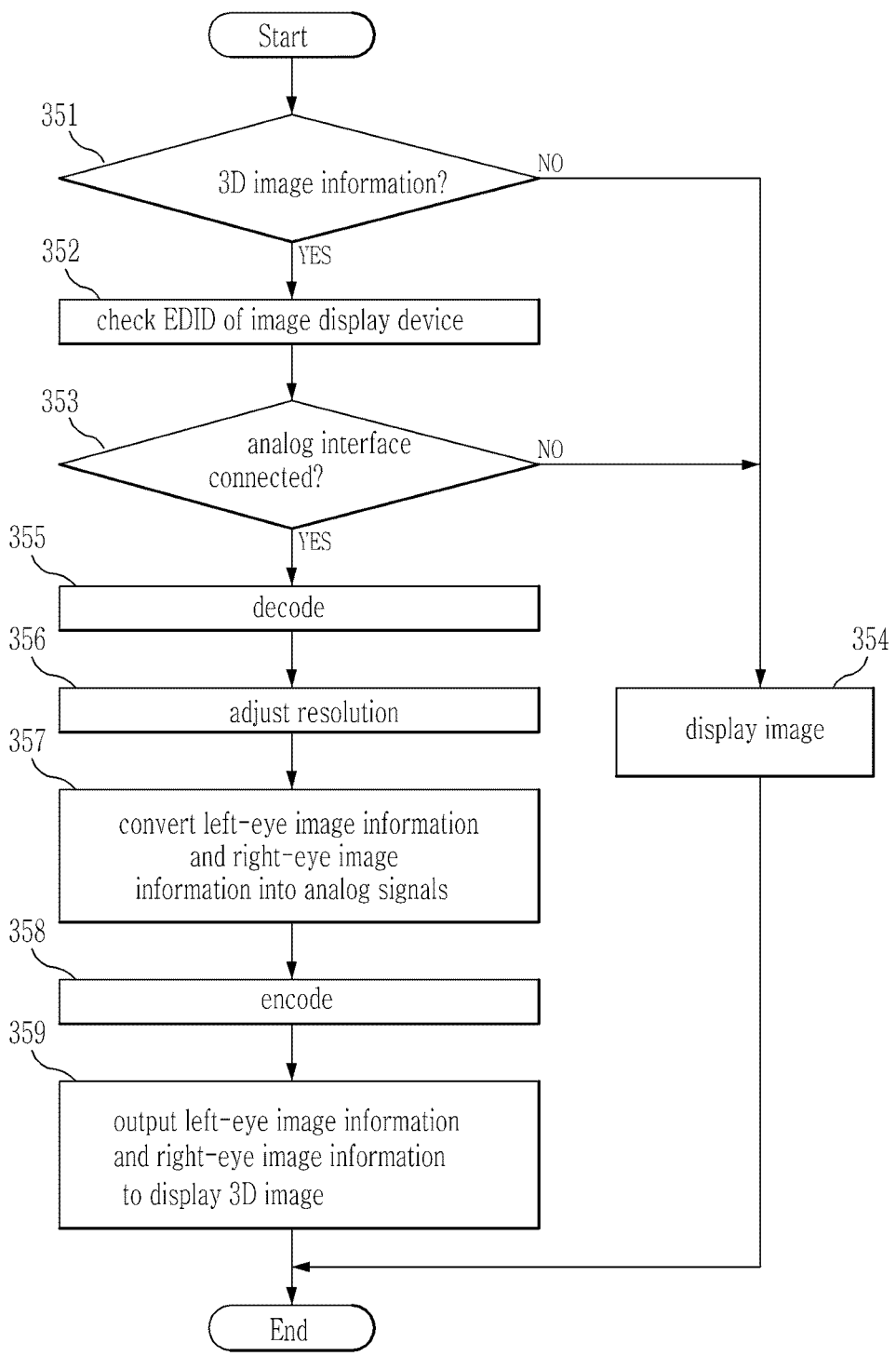

IMAGE DISPLAY SYSTEM AND DISPLAY METHOD THEREOF

CROSS-REFERENCE TO RELATED APPLICATIONS

This application is a continuation application of prior application Ser. No. 13/020,932, filed on Feb. 4, 2011, which claims priority under 35 U.S.C. §119(a) from Korean Patent Application No. 10-2010-0014718, filed on Feb. 18, 2010 in the Korean Intellectual Property Office, the disclosure of which is incorporated herein by reference in its entirety.

BACKGROUND

1. Field of the Invention

Exemplary embodiments of the present general inventive concept relate to an image display system to output a three-dimensional image recorded on an optical disc through an image display device, and a display method thereof.

2. Description of the Related Art

An image display device is a device that outputs information as an image using a screen. Such image display devices mostly display visual data, such as a characters, symbols, graphics, images, etc., through a screen.

Image display devices may include not only a cathode ray tube (CRT) such as a general monitor or television (TV) Braun tube, but also a liquid crystal display (LCD), a thin film transistor-liquid crystal display (TFT-LCD), a plasma display panel (PDP), a flexible display, etc.

Such an image display device generally outputs a two-dimensional (2D) image. Recently, an image display device capable of outputting a stereoscopic image, or three-dimensional (3D) image, has been introduced with the advance of a variety of image-related technologies.

This image display device receives a broadcast signal and displays the received broadcast signal as a 2D image or 3D image, or reads information stored on a storage medium and displays the read information as a 2D image or 3D image.

The image display device and the reproduction device communicate with each other through digital interfaces or analog interfaces. Interfaces for communication between the two devices are determined depending on whether image information stored on the optical disc is 2D image information or 3D image information.

That is, whenever playing an optical disc, the user has to determine whether image information on the optical disc is 2D image information or 3D image information, select interfaces corresponding to the determined image information, and manually interconnect the two devices via a cable so that the two devices can communicate with each other through the selected interfaces.

Also, in order to display a 3D image recorded on an optical disc on the image display device, the user has to manually carry out 3D image settings of the image display device and reproduction device.

That is, while viewing the screen of the image display device, the user decides on a 3D image format and selects a menu of the image display device and a menu of the reproduction device based on the determined format. At this time, the user has to manually carry out 3D image settings while changing screen settings until an image is normally displayed on the screen of the image display device.

In this case, if the user has no basic knowledge of 3D display, he/she may experience inconvenience and difficulty in using the image display device and the reproduction device.

SUMMARY

The present general inventive concept provides a reproduction device to read and reproduce information recorded on a storage medium, more particularly an optical disc, to display a 2D or 3D image recorded on the optical disc through an image display device, and a method thereof.

Additional features and/or utilities of the present general inventive concept will be set forth in part in the description which follows and, in part, will be obvious from the description, or may be learned by practice of the general inventive concept.

Exemplary embodiments of the present general inventive concept provide an image display system which may include an optical disc having image information thereon, an image display device having extended display identification data (EDID), and a reproduction device to analyze the EDID to determine whether an interface to connect with the image display device is analog or digital, if the image information is three-dimensional (3D) image information, and to instruct the image display device to output an alarm text if the interface is determined to be analog.

The reproduction device may instruct the image display device to output the image information if the interface is determined to be digital.

The reproduction device may transmit the image information to the image display device through the interface if the image information is two-dimensional (2D) image information.

Exemplary embodiments of the present general inventive concept also provide an image display system which may include an optical disc having image information thereon, an image display device having extended display identification data (EDID); and a reproduction device to analyze the EDID to determine whether an interface to connect with the image display device is analog or digital, if the image information is three-dimensional (3D) image information, and to instruct the image display device to output a two-dimensional (2D) image based on the 3D image information if the interface is determined to be analog.

If the interface is determined to be analog, the reproduction device may separate the 3D image information into left-eye image information and right-eye image information, convert one of the separated left-eye image information and right-eye image information into analog 2D image information, encode the converted analog 2D image information, and transmit the encoded information to the image display device through the interface.

The reproduction device may analyze the EDID to adjust a resolution of an image from the optical disc to a resolution supported by the image display device.

If the interface is determined to be digital, the reproduction device may transmit the 3D image information to the image display device through the interface.

For the transmission of the 3D image information, the reproduction device may determine a 3D image format of the optical disc, analyze the EDID to determine a 3D image format supported by the image display device, and change the 3D image format of the image display device to be compatible with the 3D image format of the optical disc.

Exemplary embodiments of the present general inventive concept provide an image display system which may include an optical disc having image information thereon, an image display device having extended display identification data (EDID); and a reproduction device to analyze the EDID to determine whether an interface to connect with the image display device is analog or digital, if the image information is three-dimensional (3D) image information, and to instruct the image display device to output an analog 3D image based on the 3D image information if the interface is determined to be analog.

If the interface is determined to be analog, the reproduction device may convert left-eye image information and right-eye image information of the 3D image information into analog left-eye image information and right-eye image information, respectively, encode the converted analog left-eye image information and right-eye image information, and transmit the encoded information to the image display device through the interface.

The analog 3D image may have one of a frame-packing format, a side-by-side format and a top-down format.

The reproduction device may analyze the EDID to adjust a resolution of the analog 3D image to an analog resolution supported by the image display device.

Exemplary embodiments of the present general inventive concept may also provide an image display method which may include determining a dimension of image information recorded on an optical disc, analyzing extended display identification data (EDID) of an image display device to determine whether an interface to connect with the image display device is analog or digital, if the image information is three-dimensional (3D) image information, and outputting an alarm text through the image display device if the interface is determined to be analog.

The image display method may further include transmitting the 3D image information to the image display device through the interface if the interface is determined to be digital, and displaying a 3D image based on the transmitted 3D image information on the image display device.

The image display method may further include transmitting the image information from the optical disc to the image display device through the interface if the image information is two-dimensional (2D) image information.

Exemplary embodiments of the present general inventive concept provide an image display method which may include: determining a dimension of image information recorded on an optical disc, analyzing extended display identification data (EDID) of an image display device to determine whether an interface to connect with the image display device is analog or digital, if the image information is three-dimensional (3D) image information, and outputting an analog image based on the 3D image information through the image display device if the interface is determined to be analog.

The outputting may include separating the 3D image information into left-eye image information and right-eye image information, converting any one of the separated left-eye image information and right-eye image information into analog two-dimensional (2D) image information, encoding the converted analog 2D image information, and transmitting the encoded information to the image display device through the interface.

The image display method may further include analyzing the EDID to determine a resolution supported by the image display device, and adjusting a resolution of an image to the resolution supported by the image display device.

The image display method may further include transmitting the 3D image information to the image display device through the interface if the interface is determined to be digital.

The outputting may include converting left-eye image information and right-eye image information of the 3D image information into analog left-eye image information and right-eye image information, respectively, encoding the converted analog left-eye image information and right-eye image information; and transmitting the encoded information to the image display device through the interface.

The image display method may further include analyzing the EDID to adjust a resolution of the analog image to an analog resolution supported by the image display device.

The image display method may further include transmitting the image information to the image display device through the interface to connect with the image display device if the image information is 2D image information.

Exemplary embodiments of the present general inventive concept may also provide a reproduction apparatus including a processor to analyze identification data of an image display device to determine whether an interface to connect with the image display device is analog or digital, if the image information is three-dimensional (3D) image information, and a controller to instruct the image display device to output an alarm text if the interface is determined to be analog.

Exemplary embodiments of the present general inventive concept may also provide an image display apparatus including an interface including an analog interface and a digital interface, and a controller to output an alarm text to a display of the image display apparatus when the image information to be output to the display is three-dimensional (3D) image information, and if the analog interface is coupled to a reproduction device that provides the image information.

Exemplary embodiments of the present general inventive concept may also provide an image display system including an image display device having identification data, and a reproduction device to analyze the identification data to determine whether an interface to connect with the image display device is analog or digital, if image information received by the reproduction device to de displayed on the image display device is three-dimensional (3D) image information, and to instruct the image display device to output an alarm text if the interface is determined to be analog.

BRIEF DESCRIPTION OF THE DRAWINGS

These and/or other utilities of the invention will become apparent and more readily appreciated from the following description of the exemplary embodiments, taken in conjunction with the accompanying drawings of which:

FIG. 7 is a flow chart illustrating an image display method according to exemplary embodiments of the present general inventive concept.

DETAILED DESCRIPTION OF THE EMBODIMENTS

Figure 1:
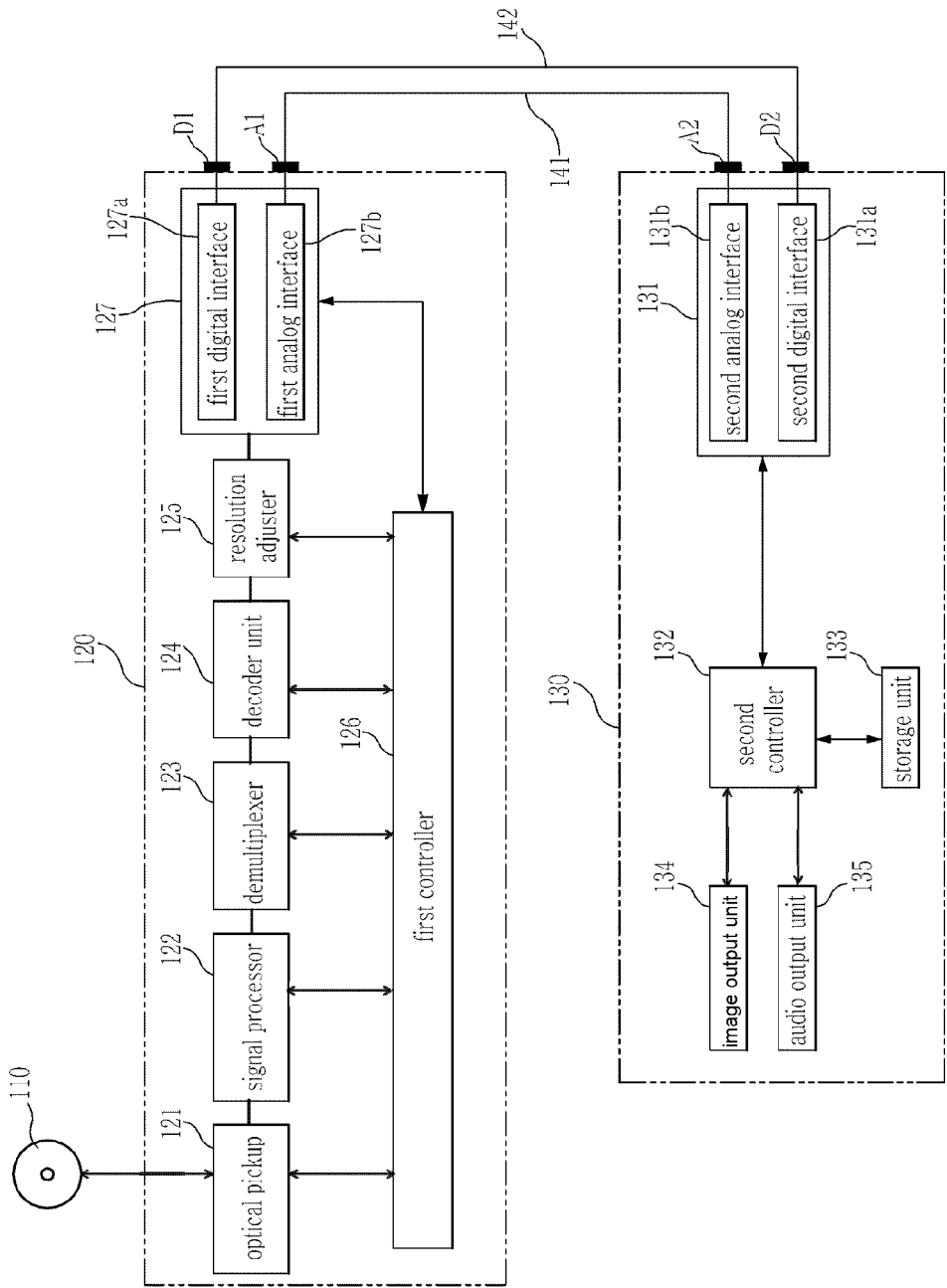
FIG. 1 is a block diagram illustrating an image display system according to exemplary embodiments of the present general inventive concept.

Reference will now be made in detail to the exemplary embodiments of the present invention, examples of which are illustrated in the accompanying drawings, wherein like reference numerals refer to like elements throughout.

FIG. 1 is a block diagram illustrating an image display system according to exemplary embodiments of the present general inventive concept, which can include an optical disc 110, a reproduction device 120, and an image display device 130.

The optical disc 110 may be a high-capacity storage medium that records/stores image information and audio information on the surface of a disc by varying a transmittance, reflectance, etc. of a laser beam.

Here, the image information can be at least one of 2D or 3D image information.

The 3D image information can include left-eye image information and right-eye image information.

That is, a human being can recognize a space with two eyes and, therefore, in order to express a 3D image, left-eye image information may be provided to the left eye and right-eye image information may be provided to the right eye.

Here, the left-eye image information and the right-eye image information may have a binocular parallax to express a cubic effect. The binocular parallax can be a difference between images of the same object viewed by the two eyes.

The optical disc 110 may include a low-density optical disc, such as a compact disc (CD) or digital versatile disc (DVD), and a high-density optical disc, such as a blu-ray disc recordable/rewritable (BD-R/RE) or high-density DVD (HD-DVD).

Here, the low-density optical disc may include a read-only type, such as a CD, CD-read only memory (ROM) or DVD-ROM, and a writable type, such as a mini disc (MD), CD-R, CD-RW, DVD-R, DVD-RW, DVD+RW or DVD-random access memory (RAM).

A blu-ray disc (BD) can record data using a blue-violet semiconductor laser beam, which can record a large amount of data, as opposed to a red laser beam. This BD typically has a 27-gigabyte (GB) data storage capacity corresponding to 13 hours of standard-definition video or 2 hours of high-definition (HD) video.

That is, 3D image information can include left-eye image information and right-eye image information for one image, resulting in a larger amount of image data being required. The 3D image information is generally recorded on a blu-ray disc capable of performing high-capacity data recording.

The reproduction device 120 can output a laser beam to the optical disc 110, recognize the intensity of the laser beam reflected from the optical disc 110, convert the recognized intensity into a digital signal to read image information therefrom, determine whether the read image information is 2D image information or 3D image information, and determine the image format of the 3D image information when the read image information is determined to be the 3D image information.

The reproduction device 120 can be connected with the image display device 130 via digital interfaces or analog interfaces, so as to transmit/receive information to/from the image display device 130 through the interfaces.

In more detail, the reproduction device 120 can include an optical pickup 121, a signal processor 122, a demultiplexer 123, a decoder unit 124, a resolution adjuster 125, a first controller 126, and an interface unit 127.

The optical pickup 121 can read data recorded on the optical disc 110 and can convert the read data into a radio frequency (RF) signal.

The signal processor 122 can amplify and wave-shape an RF signal inputted from the optical pickup 121 to extract Eight to Fourteen Modulated (EFM) data therefrom, can demodulate the EFM data and output the demodulated data to the demultiplexer 123.

The demultiplexer 123 can separate the data output from the signal processor 122 into image data and audio data and can output the separated image data and audio data to the decoder unit 124.

The decoder unit 124 can include an image decoder and an audio decoder. The image decoder can decode the image data output from the demultiplexer 123, and the audio decoder can decode the audio data output from the demultiplexer 123.

The resolution adjuster 125 can adjust the resolution of an image corresponding to the image information recorded on the optical disc 110 to an optimum 2D image resolution or optimum 3D image resolution supportable by the image display device 130 according to a command from the first controller 126. The image of the adjusted resolution can be displayed on the image display device 130. The adjusted resolution may be the same or different from a resolution of the image information.

The first controller 126 can control the driving of the optical pickup 121 to read image information recorded on the optical disc 110, and can analyze a transport stream of the read image information to determine whether the image information on the optical disc 110 is 2D image information or 3D image information.

Here, the transport stream of the image information can have a header and a payload.

The header of the transport stream can include control information for display of image data included in the payload. Image characteristic parameters associated with a display mode of the image data included in the payload can be stored at a certain position of the header of the transport stream.

The image characteristic parameters can include image identification information about whether the image data stored in the payload is 2D image data or 3D image data.

Also, where the image data stored in the payload is 3D image data, the image characteristic parameters can include 3D image format information. Here, the 3D image format information can be information about which format is applied to one frame in the process of synthesizing a 3D image.

3D image formats may include a line-by-line format, a pixel-by-pixel format, a frame-packing format, a top-down format, and a side-by-side format.

An image of the line-by-line format can be a 3D image obtained by vertically sampling a left-eye image and a right-eye image, respectively, to position pixels of the left-eye image and pixels of the right-eye image alternately on a line basis.

An image of the pixel-by-pixel format can be a 3D image obtained by horizontally sampling a left-eye image and a right-eye image, respectively, to position pixels of the left-eye image and pixels of the right-eye image alternately on a pixel basis.

An image of the frame-packing format can be a 3D image obtained by vertically sampling a left-eye image and a right-eye image, respectively, and positioning the sampled left-eye image (for example, 1920*1080) at the upper part of the 3D image and the sampled right-eye image (for example, 1920*1080) at the lower part of the 3D image, respectively.

An image of the top-down format can be a 3D image obtained by vertically ½-sub-sampling a left-eye image and a right-eye image, respectively, and positioning the sampled left-eye image (for example, 1920*540) at the upper part of the 3D image and the sampled right-eye image (for example, 1920*540) at the lower part of the 3D image, respectively.

An image of the side-by-side format can be a 3D image obtained by horizontally sampling a left-eye image and a right-eye image, respectively, and positioning the sampled left-eye image (for example, 1920*1080) at the left part of the 3D image and the sampled right-eye image (for example, 1920*1080) at the right part of the 3D image, respectively.

In the case where the image information on the optical disc 110 is 3D image information, the first controller 126 can determine an interface connected to the image display device 130 based on EDID transmitted from the image display device 130. When the determined interface is an analog interface, the first controller 126 can instruct the image display device 130 to output an alarm text.

Here, the alarm text can be a text which notifies the user that the image information recorded on the optical disc 110 may not be transmitted to the image display device 130, because it is 3D image information, and interfaces to connect the image display device 130 and the reproduction device 120 are analog interfaces.

The alarm text may include a text that invites the user to interconnect the image display device 130 and the reproduction device 120 via digital interfaces, and a text that notifies the user of how to perform such interconnection.

When the image information on the optical disc 110 includes 3D image information, the first controller 126 can determine a supportable 3D image format and resolution based on the EDID of the image display device 130, can control setting of the image format of the image display device 130 to the same image format as the format of a 3D image recorded on the optical disc 110, and can control adjustment of the resolution of the 3D image recorded on the optical disc 110 to an optimum resolution supportable by the image display device 130.

When the image information on the optical disc 110 is 2D image information, the first controller 126 can determine a supportable 2D image resolution based on the EDID of the image display device 130 and can control adjustment of the resolution of a 2D image recorded on the optical disc 110 to an optimum resolution corresponding to a result of the determination.

The interface unit 127 can include a first digital interface 127a and a first analog interface 127b.

In the reproduction device 120, any one of the first digital interface 127a and first analog interface 127b can be connected with the image display device 130.

The first digital interface 127a can be connected with a second digital interface 131a of the image display device 130 via digital terminals D1 and D2 to transmit 2D image information or 3D image information to the second digital interface 131a, and receive the EDID of the image display device 130 from the second digital interface 131a and transfer the received EDID to the first controller 126.

The first analog interface 127b can be connected with a second analog interface 131b of the image display device 130 via analog terminals A1 and A2 to transmit an alarm text output command to the second analog interface 131b, and can receive the EDID of the image display device 130 from the second analog interface 131b and transfer the received EDID to the first controller 126.

Also, audio information decoded by the decoder unit 124 can be transmitted to the image display device 130 through the first digital interface 127a or first analog interface 127b.

The image display device 130 can be connected with the reproduction device 120 via interfaces to receive image information from the reproduction device 120 and display a 2D image or 3D image.

When the image display device 130 is connected with the reproduction device 120 via analog interfaces, it can display an alarm text when the reproduction device 120 transmits 3D image information.

This image display device 130 can include an interface unit 131, a second controller 132, a storage unit 133, an image output unit 134, and an audio output unit 135.

The interface unit 131 can include the second digital interface 131a and the second analog interface 131b, one of which is connected with the reproduction device 120. Through the connected interface, extended display identification data (EDID) can be transmitted to the reproduction device 120 and image information and audio information can be transmitted from the reproduction device 120.

When a 3D image is reproduced through the reproduction device 120 under the condition that the image display device 130 is connected with the reproduction device 120 via the second analog interface 131b, an alarm text output command can be received through the second analog interface 131b.

The second controller 132 can extract the EDID from the storage unit 133 in response to a request from the reproduction device 120 and can control transmission of the extracted EDID to the reproduction device 120. The second controller 132 can control display of a 2D image or 3D image transmitted from the reproduction device 120 and output of an alarm text.

The second controller 132 can determine whether an interface connected to the reproduction device 120 is an analog interface or digital interface, and can store information about the determined interface.

The storage unit 133 can store the EDID.

Here, the EDID is information about the image display device, which can include a manufacturer's name, a product type, an EDID version, a screen size, a brightness, a pixel aspect ratio, a supportable resolution, a 2D image format, a 3D image format, connected interface information, audio information, etc. A part of this information may be modified.

The image output unit 134 can output any one of a 2D image, 3D image or alarm text according to a command received from the second controller 132.

The image output unit 134 can output a 2D image or 3D image as a digital image when the image display device 130 and the reproduction device 120 are interconnected via digital interfaces, and can output a 2D image as an analog image when the image display device 130 and the reproduction device 120 are interconnected via analog interfaces.

According to a command from the second controller 132, the audio output unit 135 can convert an audio signal transmitted from the reproduction device 130 into an analog audio signal and can output the converted analog audio signal through a speaker.

The first digital interface 127a of the reproduction device 120 and the second digital interface 131a of the image display device 130 can be interconnected via a cable 142 connected between the digital terminals D1 and D2 to communicate with each other, and the first analog interface 127b of the reproduction device 120 and the second analog interface 131b of the image display device 130 can be interconnected via a cable 141 connected between the analog terminals A1 and A2 to communicate with each other.

A high-definition multimedia interface (HDMI), which is a digital interface standard, may be used as at least one of or each of the digital interfaces 127a and 131a. This HDMI can transmit 1080P full HD high-resolution image data and 5.1 channel (or higher) audio data together as uncompressed data.

That is, because data is transmitted without compression, data loss is decreased. Also, a data rate of 10.2 gigabits can be supported, so that a transmission speed is increased. The data can be transmitted in a digital manner, thereby providing definite picture quality and sound.

A composite interface may be used as at least one of or as each of the analog interfaces 127b and 131b. This composite interface can be a general image terminal, which includes three cables (e.g., red, white and yellow cables). Here, the red and white cables transmit left and right audio channel data, respectively, and the yellow cable transmits composite image data.

Figure 2:
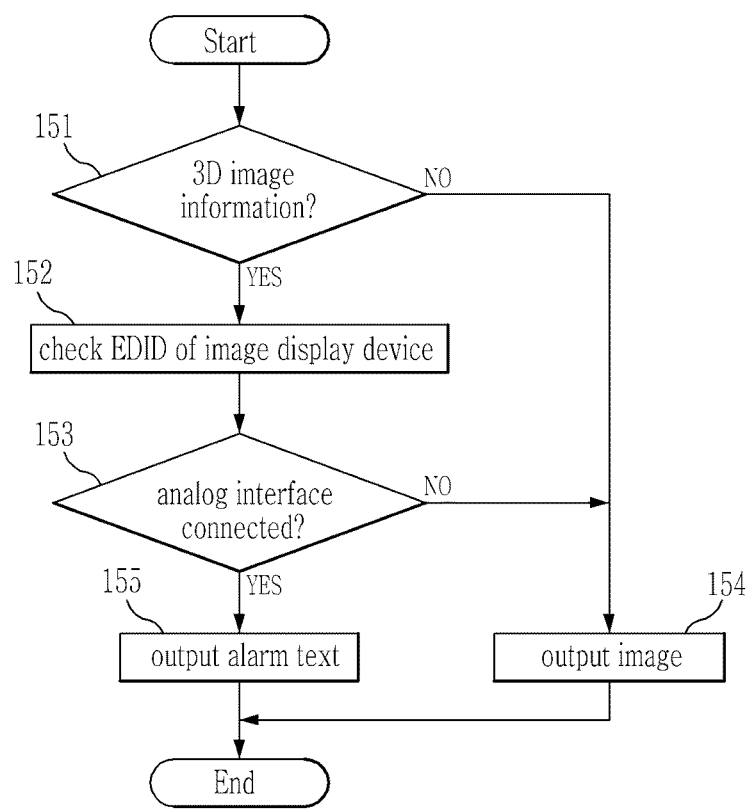
FIG. 2 is a flow chart illustrating an image display method according to exemplary embodiments of the present general inventive concept.

FIG. 2 is a flow chart illustrating an image display method of the image display system according to exemplary embodiments of the present general inventive concept, which will hereinafter be described with reference to FIG. 1.

The reproduction device 120 can output a laser beam to the optical disc 110, recognize the intensity of the laser beam reflected from the optical disc 110, convert the recognized intensity into a digital signal to read image information therefrom, and determine whether the read image information is 2D image information or 3D image information at operation 151.

When the image information recorded on the optical disc 110 is determined to be 2D image information, the reproduction device 120 can decode the 2D image information and can transmit the decoded information to the image display device 130. The image display device 130 can output and display a 2D image at operation 154.

Here, the 2D image information can be transmittable through both analog interfaces and digital interfaces.

When the reproduction device 120 is connected with the image display device 130 via the analog interfaces, it can convert the 2D image information into an analog signal and transmits the converted analog signal to the image display device 130. Alternatively, when the reproduction device 120 is connected with the image display device 130 via the digital interfaces, it can transmit the 2D image information directly as a digital signal.

To transmit the 2D image information to the image display device 130, the reproduction device 120 can adjust the resolution of the 2D image to an optimum resolution supported by the image display device 130 based on EDID of the image display device 130 and transmits the 2D image information to the image display device 130.

When the image information recorded on the optical disc 110 is determined to be 3D image information, the reproduction device 120 can determine the image format of the 3D image information, can check the EDID transmitted from the image display device 130 at operation 152 to determine whether the image display device 130 can perform a 3D image display, and can determine a 3D image format supported by the image display device 130 upon determining that the image display device 130 can perform the 3D image display.

Then, the reproduction device 120 can determine an interface connected to the image display device 130 based on the EDID of the image display device 130 at operation 153.

When the determined interface is a digital interface, the reproduction device 120 can set the image format of the image display device 130 to the same image format as the format of a 3D image recorded on the optical disc 110, can decode the 3D image information and can transmit the decoded information to the image display device 130 through the digital interface. The image display device 130 can output and display the 3D image at operation 154.

When transmitting the 3D image information to the image display device 130, the reproduction device 120 can adjust the resolution of the 3D image to an optimum resolution supported by the image display device 130 based on the EDID of the image display device 130 and can transmit the 3D image information to the image display device 130.

When the determined interface is an analog interface, the reproduction device 120 can output, through the image display device 130, an alarm text that notifies an image display failure from a miswiring of interface cables at operation 155.

When a 3D image recorded on the optical disc is output under the condition that the reproduction device and the image display device are interconnected via analog interfaces, an alarm text can be provided to notify the user that the output of the 3D image may not be carried out through the analog interfaces. Therefore, the user may recognize that the shutdown of the screen of the image display device does not result from a defect of the reproduction device or image display device.

Figure 3:
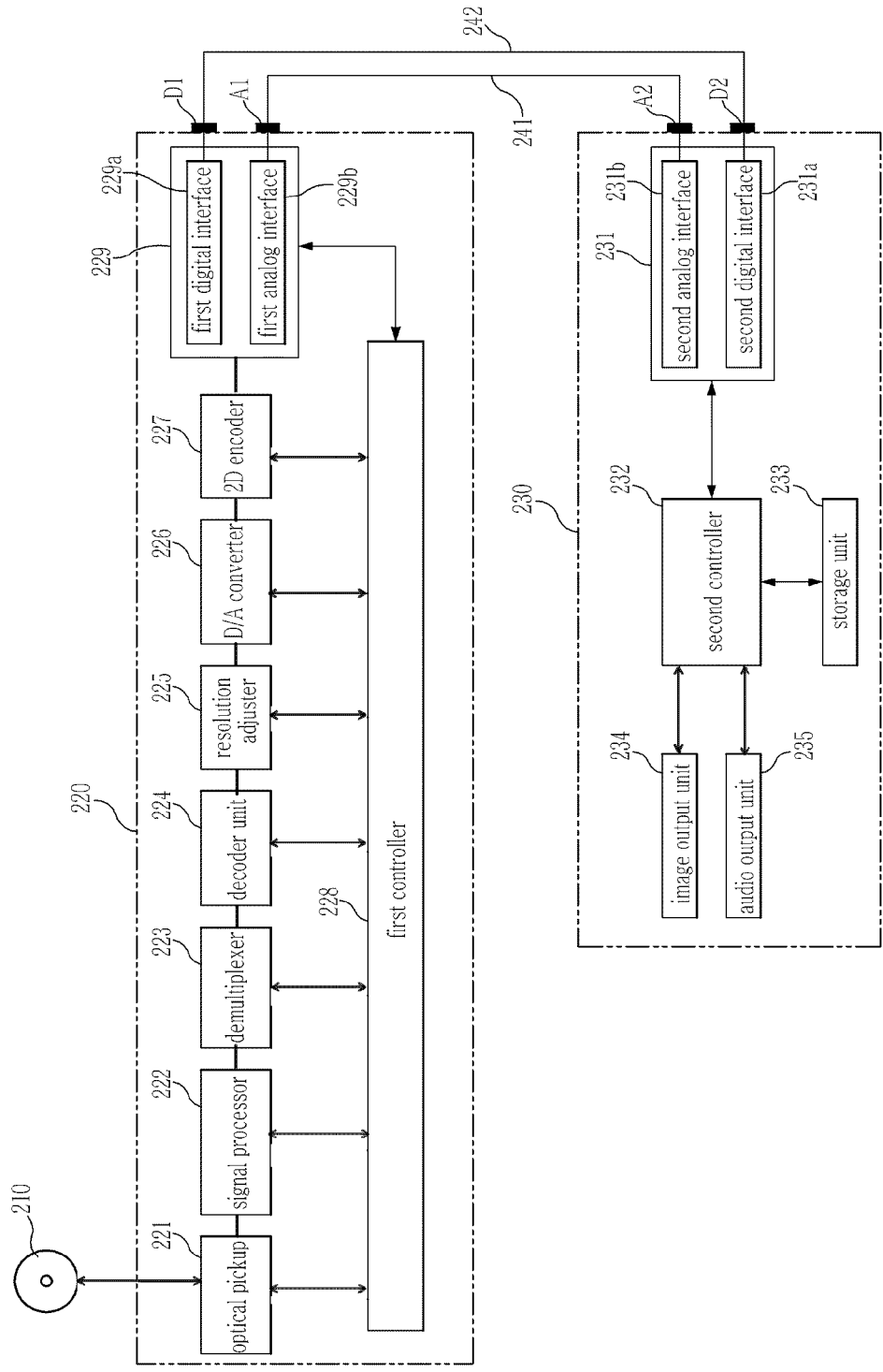
FIG. 3 is a block diagram illustrating an image display system according to exemplary embodiments of the present general inventive concept.

FIG. 3 is a block diagram illustrating an image display system according to exemplary embodiments of the present general inventive concept, which includes an optical disc 210, a reproduction device 220, and an image display device 230.

The optical disc 210 can be a high-capacity storage medium that records image information and audio information on the surface of a disc by varying a transmittance, reflectance, etc. of a laser beam.

Here, the image information can be at least one of 2D or 3D image information.

The reproduction device 220 can output a laser beam to the optical disc 210, can recognize the intensity of the laser beam reflected from the optical disc 210, can convert the recognized intensity into a digital signal to read image information therefrom, can determine whether the read image information is 2D image information or 3D image information, and can determine the image format of the 3D image information when the read image information is determined to be the 3D image information.

The reproduction device 220 can be connected with the image display device 230 via digital interfaces or analog interfaces, and can control transmission of image information to the image display device 230 through the interfaces.

In more detail, the reproduction device 220 can include an optical pickup 221, a signal processor 222, a demultiplexer 223, a decoder unit 224, a resolution adjuster 225, a digital to analog (D/A) converter 226, a 2D encoder 227, a first controller 228, and an interface unit 229.

The optical pickup 221 can read data recorded on the optical disc 210 and can convert the read data into an RF signal.

The signal processor 222 can amplify and wave-shape an RF signal inputted from the optical pickup 221 to extract EFM data therefrom, and can demodule the EFM data.

The demultiplexer 223 can separate output data from the signal processor 222 into image data and audio data and can output the separated image data and audio data to the decoder unit 224.

The decoder unit 224 can include an image decoder and an audio decoder. The image decoder can decode the image data output from the demultiplexer 223, and the audio decoder can decode the audio data output from the demultiplexer 223.

The resolution adjuster 225 can adjust the resolution of an image on the optical disc 210 to an optimum 2D image resolution or optimum 3D image resolution supportable by the image display device 230 according to a command from the first controller 228.

The D/A converter 226 can convert any one of left-eye image information or right-eye image information included in 3D image information on the optical disc 210 into an analog signal when the reproduction device 220 is connected with the image display device 230 via analog interfaces.

The 2D encoder 227 can encode any one of the left-eye image information or right-eye image information that may be converted into the analog signal, and can output the encoded information to an analog interface 229b.

The first controller 228 can control the driving of the optical pickup 221 to read image information recorded on the optical disc 210, can analyze a transport stream of the read image information to determine whether the image information on the optical disc 210 is 2D image information or 3D image information, and can determine a 3D image format upon determining that the image information on the optical disc 210 is 3D image information.

When the image information on the optical disc 210 is 3D image information, the first controller 228 can determine an interface connected to the image display device 230 based on EDID transmitted from the image display device 230. When the determined interface is an analog interface, the first controller 228 can select any one of left-eye image information or right-eye image information included in the 3D image information on the optical disc 210, can control conversion of the selected image information into an analog signal, and can control encoding of the converted analog signal.

When the image information on the optical disc 210 is determined to be 3D image information when a digital interface is connected to the image display device 230, the first controller 228 can determine a supportable 3D image format and resolution based on the EDID of the image display device 230, can control setting of the image format of the image display device 230 to the same image format as the format of a 3D image recorded on the optical disc 210, and can control adjustment of the resolution of the 3D image recorded on the optical disc 210 to an optimum resolution supportable by the image display device 230.

When the image information on the optical disc 210 is determined to be 2D image information when the digital interface is connected to the image display device 230 or when the image information on the optical disc 210 is determined to be 3D image information when the analog interface is connected to the image display device 230, the first controller 228 can determine a supportable 2D image resolution based on the EDID of the image display device 230 and can control adjustment of the resolution of a 2D image to an optimum resolution corresponding to a result of the determination.

The interface unit 229 can include a first digital interface 229a and a first analog interface 229b.

Here, the reproduction device 220 can be connected with the image display device 230 via any one of the first digital interface 229a and first analog interface 229b.

The first digital interface 229a can be connected with a second digital interface 231a of the image display device 230 via digital terminals D1 and D2 to transmit 2D image information or 3D image information, which is digital image information, to the second digital interface 231a, and can receive the EDID of the image display device 230 from the second digital interface 231a and transfer the received EDID to the first controller 228.

The first analog interface 229b can be connected with a second analog interface 231b of the image display device 230 via analog terminals A1 and A2 to transmit 2D image information, which is analog image information, to the second analog interface 231b, and can receive the EDID of the image display device 230 from the second analog interface 231b and can transfer the received EDID to the first controller 228.

Audio information decoded by the decoder unit 224 can be transmitted to the image display device 230 through the first digital interface 229a or first analog interface 229b.

The image display device 230 can be connected with the reproduction device 220 via interfaces to receive image information from the reproduction device 220 and display a 2D image or 3D image.

When the image display device 230 is connected with the reproduction device 220 via analog interfaces, it can display an analog 2D image when the reproduction device 220 transmits 3D image information.

This image display device 230 can include an interface unit 231, a second controller 232, a storage unit 233, an image output unit 234, and an audio output unit 235.

The interface unit 231 can include the second digital interface 231a and the second analog interface 231b, and the image display device 230 can be connected with the reproduction device 220 via any one thereof. Through the connected interface, extended display identification data (EDID) can be transmitted to the reproduction device 220 and image information and audio information can be transmitted from the reproduction device 220.

When a 3D image is reproduced through the reproduction device 220 when the image display device 230 is connected with the reproduction device 220 via the second analog interface 231b, analog 2D image information can be received through the second analog interface 231b.

The second controller 232 can extract the EDID from the storage unit 233 in response to a request from the reproduction device 220 and can control transmission of the extracted EDID to the reproduction device 220. Also, the second controller 232 can control display of a digital 2D image or 3D image transmitted from the reproduction device 220 or display of an analog 2D image transmitted from the reproduction device 220.

The storage unit 233 can store the EDID.

Here, the EDID can be information about the image display device, which includes a manufacturer's name, a product type, an EDID version, a screen size, a brightness, a pixel aspect ratio, a supportable resolution, a 3D image format, connected interface information, audio information, etc. A part of this information may be modified.

The image output unit 234 can display a digital 2D image or 3D image or an analog 2D image in response to a command from the second controller 232.

The image output unit 234 can output a 2D image or 3D image as a digital image when the image display device 230 and the reproduction device 220 are interconnected via digital interfaces, and can output a 2D image as an analog image when the image display device 230 and the reproduction device 220 are interconnected via analog interfaces.

According to a command from the second controller 232, the audio output unit 235 can convert an audio signal transmitted from the reproduction device 230 into an analog audio signal and can output the converted analog audio signal through a speaker.

Here, the first digital interface 229a of the reproduction device 220 and the second digital interface 231a of the image display device 230 can be interconnected via a cable 242 connected between the digital terminals D1 and D2 to communicate with each other, and the first analog interface 229b of the reproduction device 220 and the second analog interface 231b of the image display device 230 can be interconnected via a cable 241 connected between the analog terminals A1 and A2 to communicate with each other.

A high-definition multimedia interface (HDMI), which is a digital interface standard, may be used as each of the digital interfaces 229a and 231a, and a composite interface may be used as each of the analog interfaces 229b and 231b.

Figure 4:
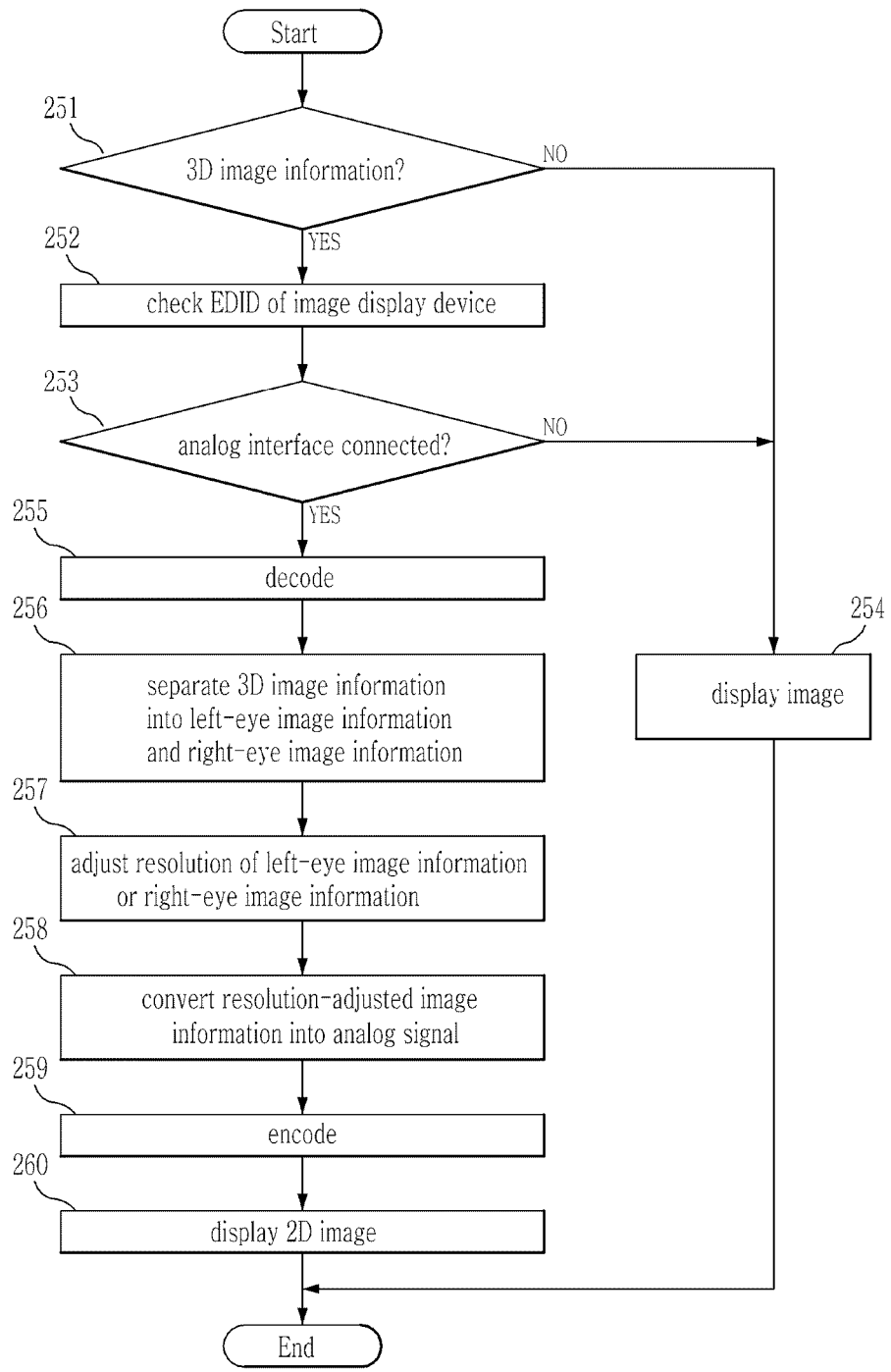
FIG. 4 is a flow chart illustrating an image display method according to exemplary embodiments of the present general inventive concept.

FIG. 4 is a flow chart illustrating an image display method of the image display system according to exemplary embodiments of the present general inventive concept, which will hereinafter be described with reference to FIG. 3.

The reproduction device 220 can output a laser beam to the optical disc 210, can recognize the intensity of the laser beam reflected from the optical disc 210, can convert the recognized intensity into a digital signal to read image information therefrom, and can determine whether the read image information is 2D image information or 3D image information at operation 251.

When the image information recorded on the optical disc 210 is determined to be 2D image information, the reproduction device 220 can decode the 2D image information and can transmit the decoded information to the image display device 230. The image display device 230 can output and display a 2D image at operation 254.

Here, the 2D image information can be transmittable through both analog interfaces and digital interfaces. When the reproduction device 220 is connected with the image display device 230 via the analog interfaces, it can convert the 2D image information into an analog signal and can transmit the converted analog signal to the image display device 230. Alternatively, when the reproduction device 220 is connected with the image display device 230 via the digital interfaces, it can transmit the 2D image information directly as a digital signal.

When transmitting the 2D image information to the image display device 230, the reproduction device 220 can adjust the resolution of the 2D image to an optimum resolution supported by the image display device 230 based on EDID of the image display device 230 and can transmit the 2D image information to the image display device 230.

When the image information recorded on the optical disc 210 is determined to be 3D image information, the reproduction device 220 can determine the image format of the 3D image information, can check the EDID transmitted from the image display device 230 at operation 252 to determine whether the image display device 230 can perform a 3D image display, and can determine a 3D image format supported by the image display device 230 upon determining that the image display device 230 can perform the 3D image display.

The reproduction device 220 can determine an interface connected to the image display device 230 based on the EDID of the image display device 230 at operation 253.

Figure 5A:
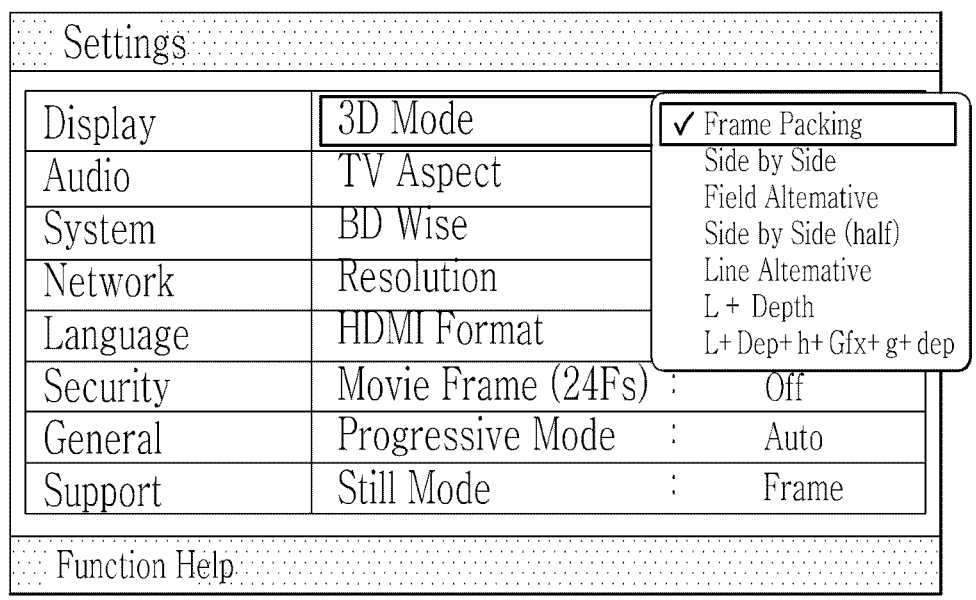
FIGS. 5A and 5B are views illustrating settings of an image display device of the image display system according to exemplary embodiments of the present general inventive concept.

When the determined interface is a digital interface, the reproduction device 220 can automatically set the image format of the image display device 230 to the same image format as the format of a 3D image recorded on the optical disc 210, as illustrated in FIG. 5A, can decode the 3D image information and can transmit the decoded information to the image display device 230 through the digital interface. The image display device 230 can output and display the 3D image at operation 254.

Figure 5B:
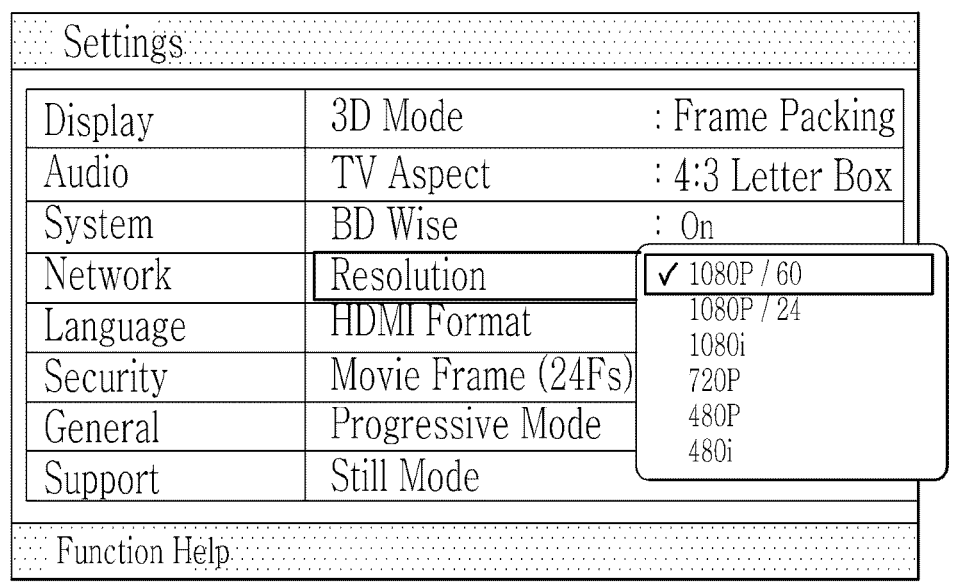

When transmitting the 3D image information to the image display device 230, the reproduction device 220 can adjust the resolution of the 3D image to an optimum resolution supported by the image display device 230 based on the EDID of the image display device 230, as illustrated in FIG. 5B, and can transmit the 3D image information to the image display device 230.

When the determined interface is an analog interface, the reproduction device 220 can decode the 3D image information on the optical disc 210 at operation 255, can separate the decoded 3D image information into left-eye image information and right-eye image information at operation 256 and can select any one of the separated left-eye image information and right-eye image information.

The reproduction device 220 can adjust the resolution of the selected image information to an optimum resolution supported by the image display device 230 based on the EDID of the image display device 230 at operation 257.

Thereafter, the reproduction device 220 can convert the resolution-adjusted image information into an analog signal at operation 258, encode the converted analog signal at operation 259 and can transmit the encoded signal to the image display device 230 through the analog interface. The image display device 230 can output and display an analog 2D image at operation 260.

When a 3D image recorded on the optical disc is output under the condition that the reproduction device and the image display device are interconnected via analog interfaces, 3D image information on the optical disc can be converted into analog 2D image information and transmitted to the image display device through the analog interfaces. Therefore, even when the reproduction device and the image display device are interconnected via the analog interfaces, the 3D image recorded on the optical disc may be output through the image display device.

Figure 6:
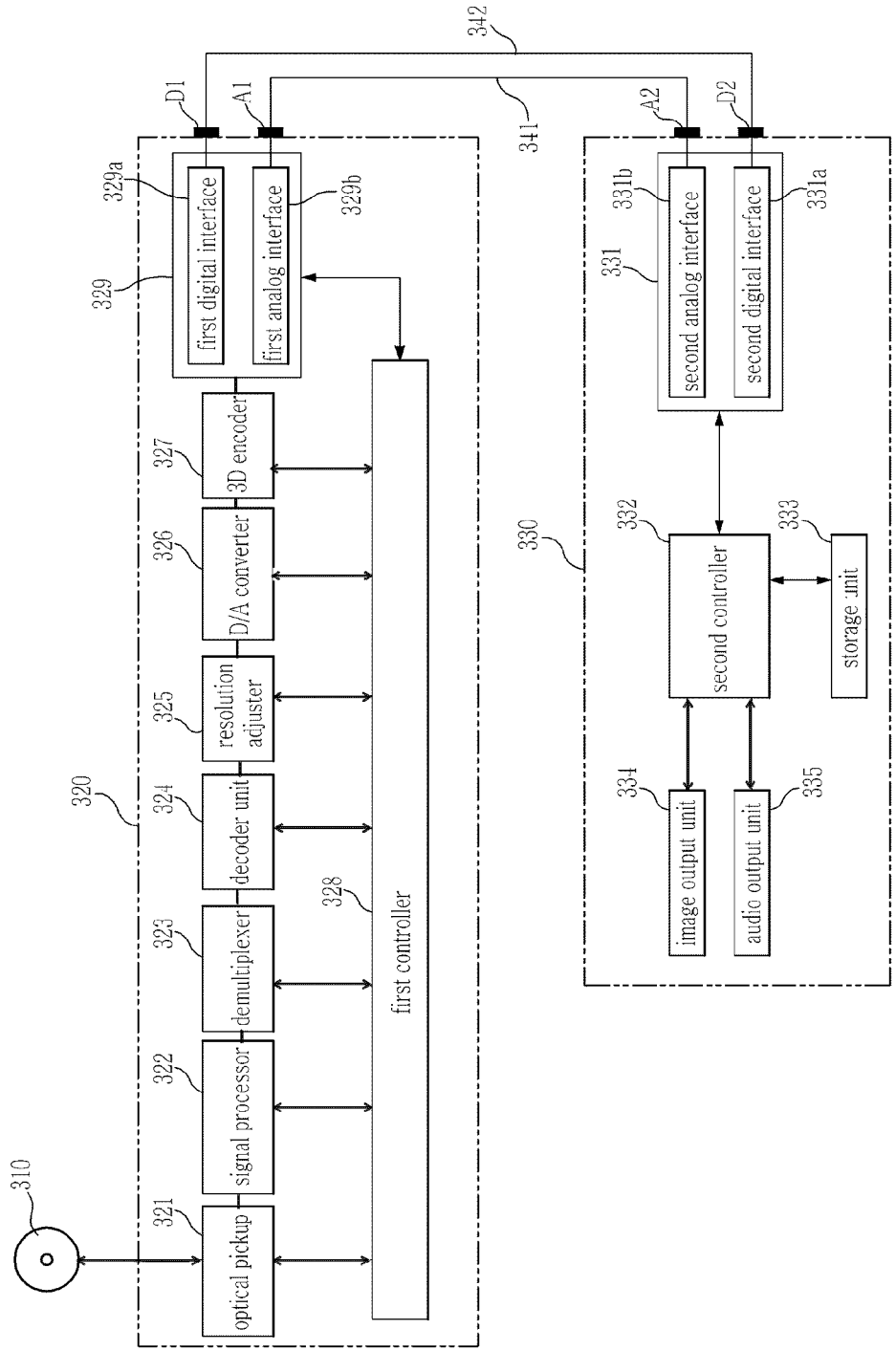
FIG. 6 is a block diagram illustrating an image display system according to exemplary embodiments of the present general inventive concept.

FIG. 6 is a block diagram illustrating an image display system according to exemplary embodiments of the present general inventive concept, which can include an optical disc 310, a reproduction device 320, and an image display device 330.

The optical disc 310 can be a high-capacity storage medium that records image information and audio information on the surface of a disc by varying a transmittance, reflectance, etc. of a laser beam.

Here, the image information can be at least one of 2D or 3D image information.

The reproduction device 320 can output a laser beam to the optical disc 310, can recognize the intensity of the laser beam reflected from the optical disc 310, can convert the recognized intensity into a digital signal to read image information therefrom, can determine whether the read image information is 2D image information or 3D image information, and can determine the image format of the 3D image information when the read image information is determined to be the 3D image information.

The reproduction device 320 can be connected with the image display device 330 via digital interfaces or analog interfaces, and can control transmission of image information to the image display device 330 through the interfaces.

In more detail, the reproduction device 320 can include an optical pickup 321, a signal processor 322, a demultiplexer 323, a decoder unit 324, a resolution adjuster 325, a D/A converter 326, a 3D encoder 327, a first controller 328, and an interface unit 329.

The optical pickup 321 can read data recorded on the optical disc 310 and can convert the read data into an RF signal.

The signal processor 322 can amplify and wave-shape an RF signal inputted from the optical pickup 321 to extract EFM data therefrom, and can demodulate the EFM data.

The demultiplexer 323 can separate output data from the signal processor 322 into image data and audio data and can output the separated image data and audio data to the decoder unit 324.

The decoder unit 324 can include an image decoder and an audio decoder. The image decoder can decode the image data output from the demultiplexer 323, and the audio decoder can decode the audio data output from the demultiplexer 323.

The resolution adjuster 325 can adjust the resolution of an image on the optical disc 310 to an optimum 2D image resolution or optimum 3D image resolution supportable by the image display device 330 according to a command from the first controller 328.

The D/A converter 326 can convert left-eye image information and right-eye image information included in 3D image information on the optical disc 310 into analog signals, respectively, when the reproduction device 320 is connected with the image display device 330 via analog interfaces.

The 3D encoder 327 can encode the left-eye image information and right-eye image information, converted into the analog signals, respectively, and can output the encoded information to an analog interface 329b.

The first controller 328 can control the driving of the optical pickup 321 to read image information recorded on the optical disc 310, can analyze a transport stream of the read image information to determine whether the image information on the optical disc 310 is 2D image information or 3D image information, and can determine a 3D image format upon determining that the image information on the optical disc 310 is 3D image information.

When the image information on the optical disc 310 is 3D image information, the first controller 328 can determine an interface connected to the image display device 330 based on EDID transmitted from the image display device 330. When the determined interface is an analog interface, the first controller 328 can control respective conversions of left-eye image information and right-eye image information included in the 3D image information on the optical disc 310 into analog signals, and can control encoding of the converted analog signals.

When the image information on the optical disc 310 is determined to be 3D image information when a digital interface is connected to the image display device 330, the first controller 328 can determine a supportable 3D image format and resolution based on the EDID of the image display device 330, can control setting of the image format of the image display device 330 to the same image format as the format of a 3D image recorded on the optical disc 310, and can control adjustment of the resolution of the 3D image recorded on the optical disc 310 to an optimum resolution supportable by the image display device 330.

When the image information on the optical disc 310 is determined to be 2D image information when the digital interface is connected to the image display device 330, the first controller 328 can determine a supportable 2D image resolution based on the EDID of the image display device 330 and can control adjustment of the resolution of a 2D image to an optimum resolution corresponding to a result of the determination.

When the image information on the optical disc 310 is determined to be 3D image information when the analog interface is connected to the image display device 330, the first controller 328 can determine a supportable analog image resolution based on the EDID of the image display device 330 and can control adjustment of the resolution of an analog image to an optimum resolution corresponding to a result of the determination.

The interface unit 329 can include a first digital interface 329a and a first analog interface 329b.

Here, the reproduction device 320 can be connected with the image display device 330 via any one of the first digital interface 329a and first analog interface 329b.

The first digital interface 329a can be connected with a second digital interface 331a of the image display device 330 via digital terminals D1 and D2 to transmit 2D image information or 3D image information, which is digital image information, to the second digital interface 331a, and can receive the EDID of the image display device 330 from the second digital interface 331a and can transfer the received EDID to the first controller 328.

The first analog interface 329b can be connected with a second analog interface 331b of the image display device 330 via analog terminals A1 and A2 to transmit 2D or 3D image information, which is analog image information, to the second analog interface 331b, and can receive the EDID of the image display device 330 from the second analog interface 331b and can transfer the received EDID to the first controller 328.

The image display device 330 can be connected with the reproduction device 320 via interfaces to receive image information from the reproduction device 320 and can display a digital 2D image or 3D image or an analog 2D image or 3D image.

When the image display device 330 is connected with the reproduction device 320 via analog interfaces, it can display an analog 3D image when the reproduction device 320 transmits 3D image information, and an analog 2D image when the reproduction device 320 transmits 2D image information.

When the image display device 330 is connected with the reproduction device 320 via digital interfaces, it can display a digital 3D image when the reproduction device 320 transmits 3D image information, and a digital 2D image when the reproduction device 320 transmits 2D image information.

This image display device 330 can include an interface unit 331, a second controller 332, a storage unit 333, an image output unit 334, and an audio output unit 335.

The interface unit 331 can include the second digital interface 331a and the second analog interface 331b, and the image display device 330 can be connected with the reproduction device 320 via any one thereof. Through the connected interface, extended display identification data (EDID) can be transmitted to the reproduction device 320 and image information and audio information can be transmitted from the reproduction device 320.

When a 3D image is reproduced through the reproduction device 320 under the condition that the image display device 330 is connected with the reproduction device 320 via the second analog interface 331b, analog 2D image information can received through the second analog interface 331b.

The second controller 332 can extract the EDID from the storage unit 333 in response to a request from the reproduction device 320 and controls transmission of the extracted EDID to the reproduction device 320. Also, the second controller 332 can control display of a digital 2D image or 3D image transmitted from the reproduction device 320 or display of an analog 2D image or 3D image transmitted from the reproduction device 320.

The storage unit 333 can store the EDID.

The image output unit 334 can display a digital 2D image or 3D image or an analog 2D image or 3D image according to a command from the second controller 332.

The image output unit 334 can output a 2D image or 3D image as a digital image when the image display device 330 and the reproduction device 320 are interconnected via digital interfaces, and can output a 2D image or 3D image as an analog image when the image display device 330 and the reproduction device 320 are interconnected via analog interfaces.

According to a command from the second controller 332, the audio output unit 335 can convert an audio signal transmitted from the reproduction device 330 into an analog audio signal and can output the converted analog audio signal through a speaker.

Here, the first digital interface 329a of the reproduction device 320 and the second digital interface 331a of the image display device 330 can be interconnected via a cable 342 connected between the digital terminals D1 and D2 to communicate with each other, and the first analog interface 329b of the reproduction device 320 and the second analog interface 331b of the image display device 330 can be interconnected via a cable 341 connected between the analog terminals A1 and A2 to communicate with each other.

A high-definition multimedia interface (HDMI), which is a digital interface standard, may be used as each of the digital interfaces 329a and 331a, and a composite interface may be used as each of the analog interfaces 329b and 331b.

FIG. 7 is a flow chart illustrating an image display method of the image display system according to exemplary embodiments of the present general inventive concept, which will hereinafter be described with reference to FIG. 6.

The reproduction device 320 can output a laser beam to the optical disc 310, can recognize the intensity of the laser beam reflected from the optical disc 310, can convert the recognized intensity into a digital signal to read image information therefrom, and can determine whether the read image information is 2D image information or 3D image information at operation 351.

When the image information recorded on the optical disc 310 is determined to be 2D image information, the reproduction device 320 can decode the 2D image information and can transmit the decoded information to the image display device 330. As a result, the image display device 330 can output and display a 2D image at operation 354.

When the reproduction device 320 is connected with the image display device 330 via analog interfaces, it can convert the 2D image information into an analog signal and can transmit the converted analog signal to the image display device 330. Alternatively, when the reproduction device 320 is connected with the image display device 330 via digital interfaces, it transmits the 2D image information directly as a digital signal.

When transmitting the 2D image information to the image display device 330, the reproduction device 320 can adjust the resolution of the 2D image to an optimum resolution supported by the image display device 330 based on EDID of the image display device 330 and can transmit the 2D image information to the image display device 330.

When the image information recorded on the optical disc 310 is determined to be 3D image information, the reproduction device 320 can determine the image format of the 3D image information, can check the EDID transmitted from the image display device 330 at operation 352 to determine whether the image display device 330 can perform a 3D image display, and can determine a 3D image format supported by the image display device 330 upon determining that the image display device 330 can perform the 3D image display.

The reproduction device 320 can determine an interface connected to the image display device 330 based on the EDID of the image display device 330 at operation 353.

When the determined interface is a digital interface, the reproduction device 320 can automatically set the image format of the image display device 330 to the same image format as the format of a 3D image recorded on the optical disc 310, can decode the 3D image information and can transmit the decoded information to the image display device 330 through the digital interface. The image display device 330 can output and displays the 3D image at operation 354.

When transmitting the 3D image information to the image display device 330, the reproduction device 320 can adjust the resolution of the 3D image to an optimum resolution supported by the image display device 330 based on the EDID of the image display device 330, and can transmit the 3D image information to the image display device 330.

When the determined interface is an analog interface, the reproduction device 320 decodes the 3D image information on the optical disc 310 at operation 355, and can adjust the resolution of left-eye image information and right-eye image information of the decoded 3D image information to an optimum analog image resolution supported by the image display device 330 at operation 356.

The reproduction device 320 can convert the resolution-adjusted left-eye image information and right-eye image information into analog signals, respectively at operation 357, can encode the converted analog signals at operation 358 and can transmit the encoded signals to the image display device 330 through the analog interface. The image display device 330 can output and display an analog 3D image at operation 359.

The analog 3D image may have a digital 3D image format. For example, the analog 3D image may have any one of a line-by-line format, a pixel-by-pixel format, a frame-packing format, a top-down format and a side-by-side format.

In this manner, when a 3D image recorded on the optical disc is output when the condition that the reproduction device and the image display device are interconnected via analog interfaces, left-eye image information and right-eye image information of 3D image information on the optical disc can be converted into analog 3D image information and can be transmitted to the image display device through the analog interfaces. Therefore, even when the reproduction device and the image display device are interconnected via the analog interfaces, the 3D image recorded on the optical disc may be output through the image display device.

As is apparent from the above description, according to exemplary embodiments of the present general inventive concept, when a 3D image recorded on an optical disc is output when a reproduction device and an image display device are interconnected via analog interfaces, an alarm text is provided to notify the user that the output of the 3D image may not be carried out through the analog interfaces. Therefore, the user may recognize that the shutdown of the screen of the image display device does not result from a defect of the reproduction device or image display device.

Also, in this case, because the 3D image may not be supported and thus may not be displayed, a menu may be provided to the user to invite him/her to execute a process of converting the 3D image into a 2D image. This menu may be configured to output the 3D image as the 2D image. Therefore, the user may set the output of the 2D image through the menu.

According to exemplary embodiments of the present invention, when a 3D image recorded on an optical disc is output when a reproduction device and an image display device are interconnected via analog interfaces, 3D image information on the optical disc can be converted into analog 2D image information and can be transmitted to the image display device through the analog interfaces. Therefore, even when the reproduction device and the image display device are interconnected via the analog interfaces, the 3D image recorded on the optical disc may be output through the image display device.

According to exemplary embodiments of the present general inventive concept, when a 3D image recorded on an optical disc is output when a reproduction device and an image display device are interconnected via analog interfaces, 3D image information on the optical disc can be converted into analog 3D image information and can be transmitted to the image display device through the analog interfaces. Therefore, even when the reproduction device and the image display device can be interconnected via the analog interfaces, the 3D image recorded on the optical disc may be output through the image display device.

That is, even when the image display device and the reproduction device are interconnected via the analog interfaces, a 2D image or 3D image may be output based on the 3D image information on the optical disc.

According to exemplary embodiments of the present general inventive concept, a reproduction device can determine, based on EDID transmitted from an image display device, whether the image display device can support output of a 3D image. The reproduction device can determine a 3D image format and 3D image resolution supportable by the image display device based on the EDID. Therefore, the reproduction device may automatically and optimally set the output of the 3D image based on the determination results.

Although several exemplary embodiments of the present invention have been illustrated and described, it would be appreciated by those skilled in the art that changes may be made in these exemplary embodiments without departing from the principles and spirit of the invention.

What is claimed is:

1. An image processing apparatus to reproduce image data stored in a storage medium, the image processing apparatus comprising:
   a reader device to read the image data from the storage medium, the image data including left-eye image data and right-eye image data;
   a decoder to output the left-eye image data and the right-eye image data by decoding the image data;
   a digital interface to output a digital image signal;
   an analog interface to output an analog image signal; and
   a controller to determine whether there is a connection of the digital interface, and upon the connection of the digital interface, to control the output of a digital image signal corresponding to a left-eye image and a right-eye image through the digital interface, and upon the disconnection of the digital interface, to control the output of an analog image signal corresponding to one of a left-eye image and a right-eye image through the analog interface.

2. The image processing apparatus of claim 1, wherein when the image data is three-dimensional (3D) image information and the digital interface is not connected, the controller to control the output of reproduction-unavailability information indicating that the reproduction of the 3D image information is not available via the analog interface.

3. The image processing apparatus of claim 1, wherein the controller controls at least one the analog interface or the digital interface that is connected to output the image data when the image data is two-dimensional (2D) image information.

4. The image processing apparatus of claim 1, wherein, when the controller determines that the analog interface is connected, and that the image data is three dimensional (3D) image information the controller converts the left-eye image data and the right-eye image data of the image data into analog left-eye image data and right-eye image data, respectively, encodes the converted analog left-eye image data and right-eye image data, and transmits the encoded information through the analog interface.

5. The image processing apparatus of claim 4, wherein the encoded information has one of a frame-packing format, a side-by-side format and a top-down format.

6. The image processing apparatus of claim 1, wherein when the image data is three-dimensional (3D) image information and the analog interface is connected, the controller controls the decoder to separate the 3D image information into the left-eye image data and the right-eye image data, to convert any one of the separated left-eye image data and right-eye image data into analog image information, to encode the converted analog image information, and to transmit the encoded analog image information through the analog interface.

7. The image processing apparatus of claim 6, wherein the controller controls the conversion of the analog image information into two-dimensional (2D) image information, controls the encoding of the converted analog 2D image information, and controls transmission of the encoded analog 2D image information through the analog interface.

8. The image processing apparatus of claim 1, wherein the controller analyzes extended display identification data (EDID) of a connected external device to determine the connection of the digital interface and a resolution supported by the external device, and adjusts a resolution of the image data stored in the storage medium to the resolution supported by the external device.

9. The image processing apparatus of claim 8, wherein to adjust the resolution of the image data, a resolution of the left-eye image and the right-eye image are adjusted to a resolution supported by the external device.

10. The image processing apparatus of claim 1, wherein when the image data is three-dimensional (3D) image information, the controller transmits the 3D image information to an external device through the digital interface when the interface connected to the external device is the digital interface.

11. An image processing apparatus to reproduce image data stored in a storage medium, the image processing apparatus comprising:

a reader device to read the image data from the storage medium, the image data including left-eye image data and right-eye image data;

a decoder to decode the image data and to output the left-eye image data and the right-eye image data;

a digital interface to output a digital image signal;

an analog interface to output an analog image signal; and a controller to determine a connection of the digital interface, and upon connection of the digital interface, to control the output of a digital image signal corresponding to a left-eye image and a right-eye image through the digital interface, and upon disconnection of the digital interface, to control the output of a message indicating that three-dimensional (3D) reproduction is not possible through the analog interface.

12. The image processing apparatus of claim 11, wherein the controller controls at least one the analog interface or the digital interface that is connected to output the image data when the image data is two-dimensional (2D) image information.

13. The image processing apparatus of claim 11, wherein, when the controller determines that the analog interface is connected, and that the image data is three-dimensional 3D image information, the controller converts the left-eye image data and the right-eye image data of the image data into analog left-eye image data and right-eye image data, respectively, encodes the converted analog left-eye image data and right-eye image data, and transmits the encoded information through the analog interface.

14. The image processing apparatus of claim 13, wherein the encoded information has one of a frame-packing format, a side-by-side format and a top-down format.

15. The image processing apparatus of claim 11, wherein when the image data is 3D image information and the analog interface is connected, the controller controls the decoder to separate the 3D image information into the left-eye image data and the right-eye image data, to convert any one of the separated left-eye image data and right-eye image data into analog image information, to encode the converted analog image information, and to transmit the encoded analog image information through the analog interface.

16. The image processing apparatus of claim 15, wherein the controller controls the conversion of the analog image information into two-dimensional (2D) image information, controls the encoding of the converted analog 2D image information, and controls transmission of the encoded analog 2D image information through the analog interface.

17. The image processing apparatus of claim 11, wherein the controller analyzes extended display identification data (EDID) of a connected external device to determine the connection of the digital interface and a resolution supported by the external device, and adjusts a resolution of the image data stored in the storage medium to the resolution supported by the external device.

18. The image processing apparatus of claim 17, wherein to adjust the resolution of the image data, a resolution of the left-eye image and the right-eye image are adjusted to a resolution supported by the external device.

19. The image processing apparatus of claim 11, wherein when the image data is 3D image information, the controller transmits the 3D image information to an external device through the digital interface when the interface connected to the external device is the digital interface.

20. An image processing apparatus to reproduce image data stored in a storage medium, the image data including left-eye image data and right-eye image data, the image processing apparatus comprising:

a digital interface to output a digital image signal;

an analog interface to output an analog image signal; and a controller to control the output of the digital image signal corresponding to both of the left-eye image data and the right-eye image data stored in the storage medium as three dimensional (3D) image information via the digital interface, and to control the output of the analog image signal corresponding to one of the left-eye image data and the right-eye image data stored in the storage medium via the analog interface.

21. An electronic apparatus, comprising:

a digital interface to output a digital image signal;

an analog interface to output an analog image signal; and a controller to control through the digital interface the output of the digital image signal corresponding to both left-eye image data and right-eye image data stored in a storage medium as three dimensional (3D) image information while determining the digital interface is connected to a digital interface of an external device, and to control through the analog interface the output of the analog image signal corresponding to any one of the left-eye image data and the right-eye image data stored in the storage medium while determining the analog interface is connected to a analog interface of the external device, without the digital interface being connected to the digital interface of the external device.

* * * * *